Figure 1:
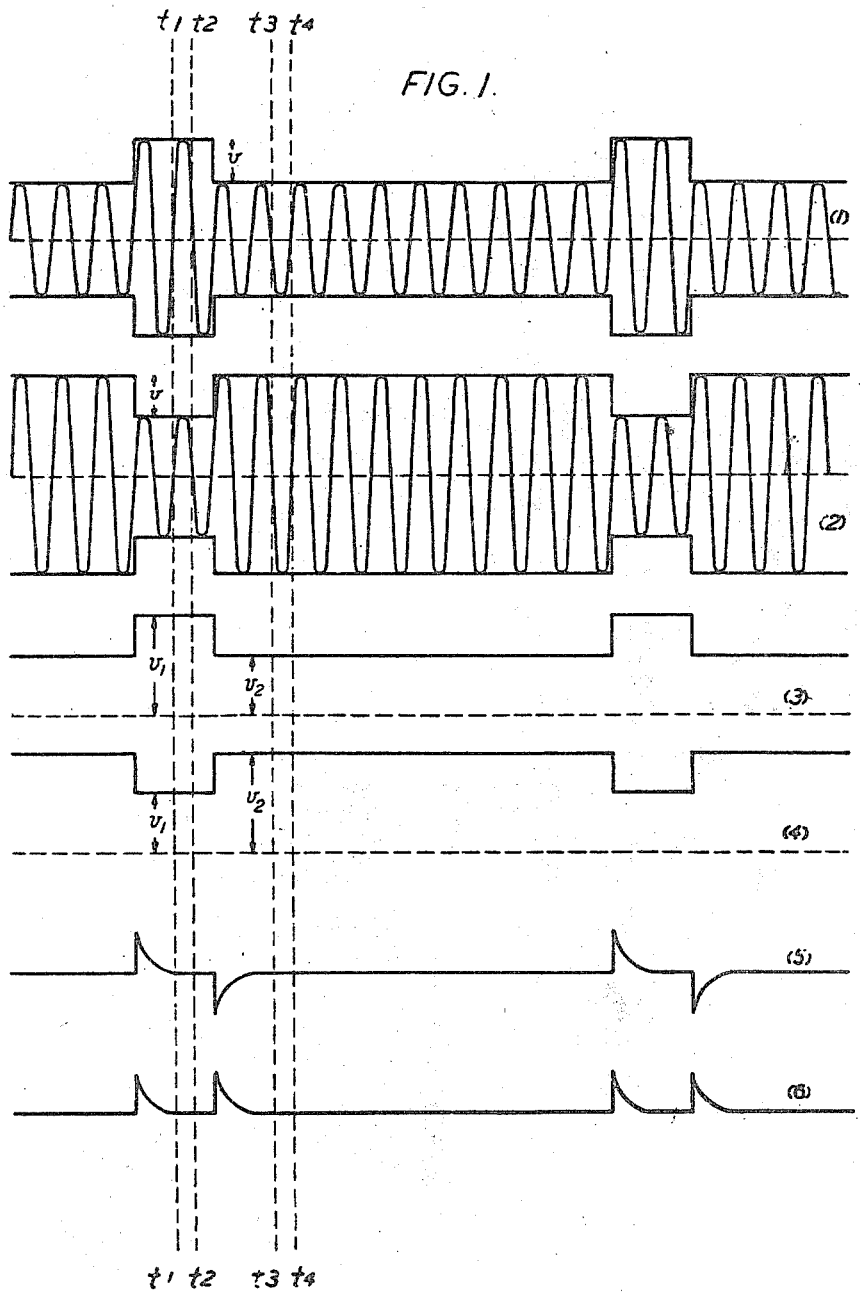

INVENTORS:
Victor John Terry, and
Thomas Frederick Stanley Hargreaves
ATTORNEY.

INVENTORS:
Victor John Terry, and
Thomas Frederick Stanley Hargreaves
ATTORNEY.

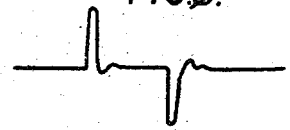
FIG.5.
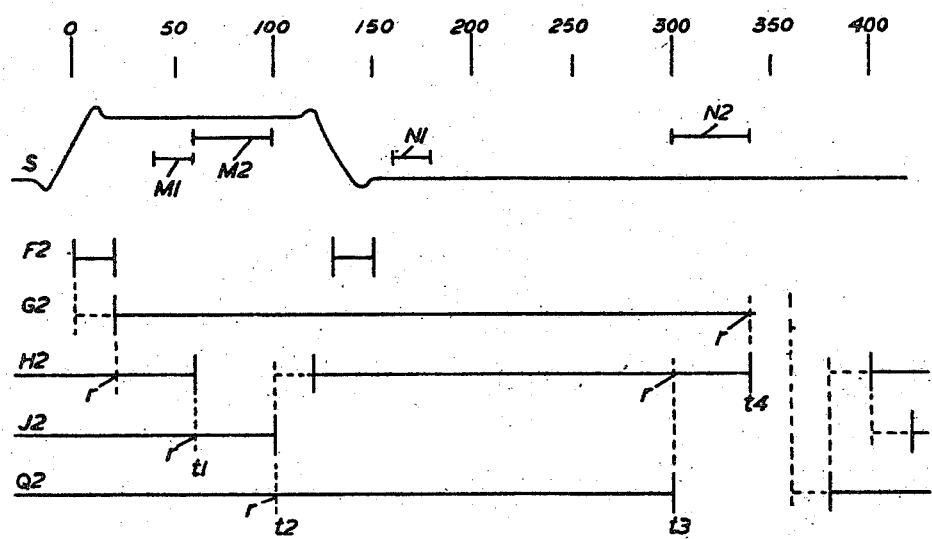
FIG.6.
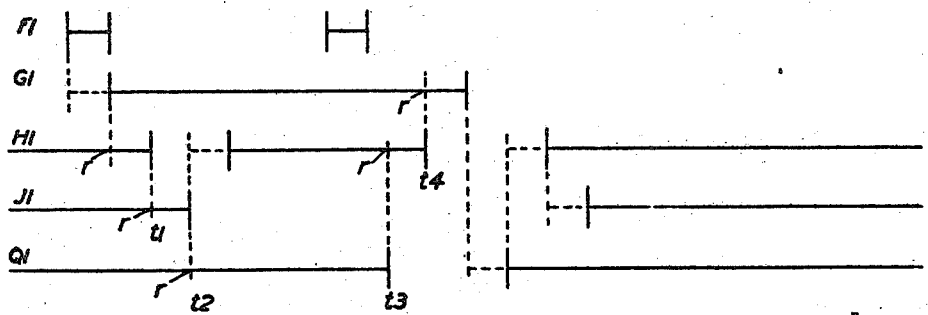

Patented Apr. 29, 1947

2,419,607

UNITED STATES PATENT OFFICE 2,419,607

MEASURING ELECTRICAL SIGNAL AMPLITUDE CHANGES

Victor John Terry and Thomas Frederick Stanley Hargreaves, London, England, assignors, by mesne assignments, to International Standard Electric Corporation, New York, N. Y., a corporation of Delaware Application June 7, 1943, Serial No. 489,904
In Great Britain April 14, 1942

22 Claims. (Cl. 177—352)

The present invention relates to arrangements for measuring electrical voltage or amplitude changes, with particular application to blind landing systems for aircraft.

One of the well known methods for indicating the course for a landing aircraft is to transmit two similar overlapping, but differently directed, radiation patterns from two corresponding aerials, on different wave lengths, the waves being respectively modulated by interlocking dot-dash signals.

The aircraft receives the waves with constant amplitude when on the right course, but when off the course it receives the dots with greater amplitude than the dashes on one side of the course, and with smaller amplitude than the dashes on the other side, the difference between the two amplitudes being a measure of the departure of the aircraft from the course. The signal used for modulating the waves may consist of an audio frequency tone switched on and off in a series of dots and dashes, the on periods being dots for one side of the course and dashes for the other side. The signals may be detected and applied to ordinary head-receivers, or may be further rectified and used to operate a direct current meter, the readings of which can be made to indicate when the aircraft is on the desired course, or on which side thereof it is flying. Various other arrangements have also been used to give the required indications.

The present invention is directed principally towards improving the operation of a meter indication system. In some of the existing arrangements, the average reading of the meter is proportional to the difference between the dot and the dash amplitude, but a large proportion of the current may flow through the meter during the short period of the dot. In order that the meter needle may reach the required reading in a reasonable time, it must have a short enough natural period to follow the impulses fairly closely, and is therefore subject to kicking, which makes it difficult to read. The present invention proposes arrangements whereby measurements are made of the dfference between the dot and dash amplitudes at suitable times. The result of the measurements is applied to the meter so that the needle rapidly reaches the required reading and remains practically steady (there being a slight decay). The amplitudes are periodically stored in condensers so that after the needle has reached the final indication, the meter is no longer subjected to any appreciable impulses, and therefore the needle remains steady until there is a change in the amplitude difference, when it moves to the new reading.

The invention has, however, other applications besides to blind landing of aircraft. It could be used in any circumstances where a repeated change of amplitude or voltage of a signal is to be measured or applied to perform some function.

According to the invention there is provided an electrical arrangement in which a repeatedly occurring voltage change is caused to produce in a branch of a thermionic valve circuit a current determined in magnitude and sign by the said voltage change, by applying the voltage before and after any change respectively to charge two condensers, and by employing the difference between the charges acquired by the condensers to control the valve circuit.

According to another aspect, the invention provides an arrangement for indicating in magnitude and sign a change which repeatedly occurs in an electric voltage, in which two condensers are respectively charged to potentials corresponding to the values of the voltage before and after a change, the difference between the charges of the condensers being then shared with a third condenser or group of condensers; and in which the potential acquired by the said third condenser or group of condensers is applied to a thermionic valve circuit in such a manner that a current measuring instrument included in the valve circuit indicates the value of the said voltage change.

According to a further view, the invention may consist in an arrangement for deriving an electric current which depends in magnitude and sign upon the change in amplitude of an electric signal wave, which amplitude repeatedly alternates between two values, comprising means for charging two condensers respectively to potentials corresponding to the said two values, means for applying the difference of the said potentials to charge a third condenser or group of condensers, and means to apply the potential acquired by the third condenser or group of condensers to control a thermionic valve circuit in a branch of which the said substantially constant electric current is generated.

According to still another aspect, the invention comprises an arrangement for obtaining a steady reading on a current measuring instrument connected in a branch of a thermionic valve circuit, which reading indicates the magnitude and sign of a constantly repeated change in amplitude of an electric signal wave, comprising means for deriving from the wave two electric voltages proportional respectively to the amplitudes of the wave before and after a change, means for applying the said voltages respectively to two condensers, means for connecting the two condensers to a third condenser or group of condensers so that the combination acquires a charge proportional to the difference between the charges of the two first mentioned condensers, and means for applying the potential acquired by the combination to control the valve circuit.

The invention will be described with reference to the figures of the accompanying drawings.

Figure 2:
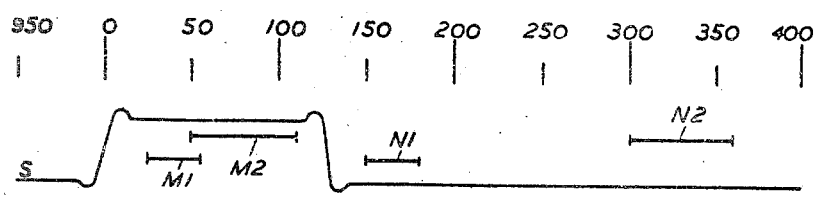
Figure 2:
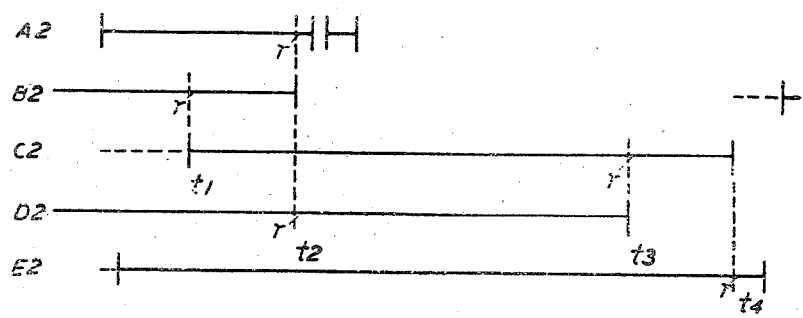
Figure 2:
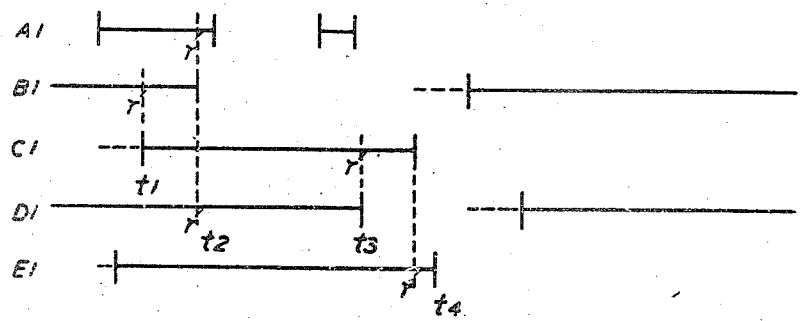
Figure 3:
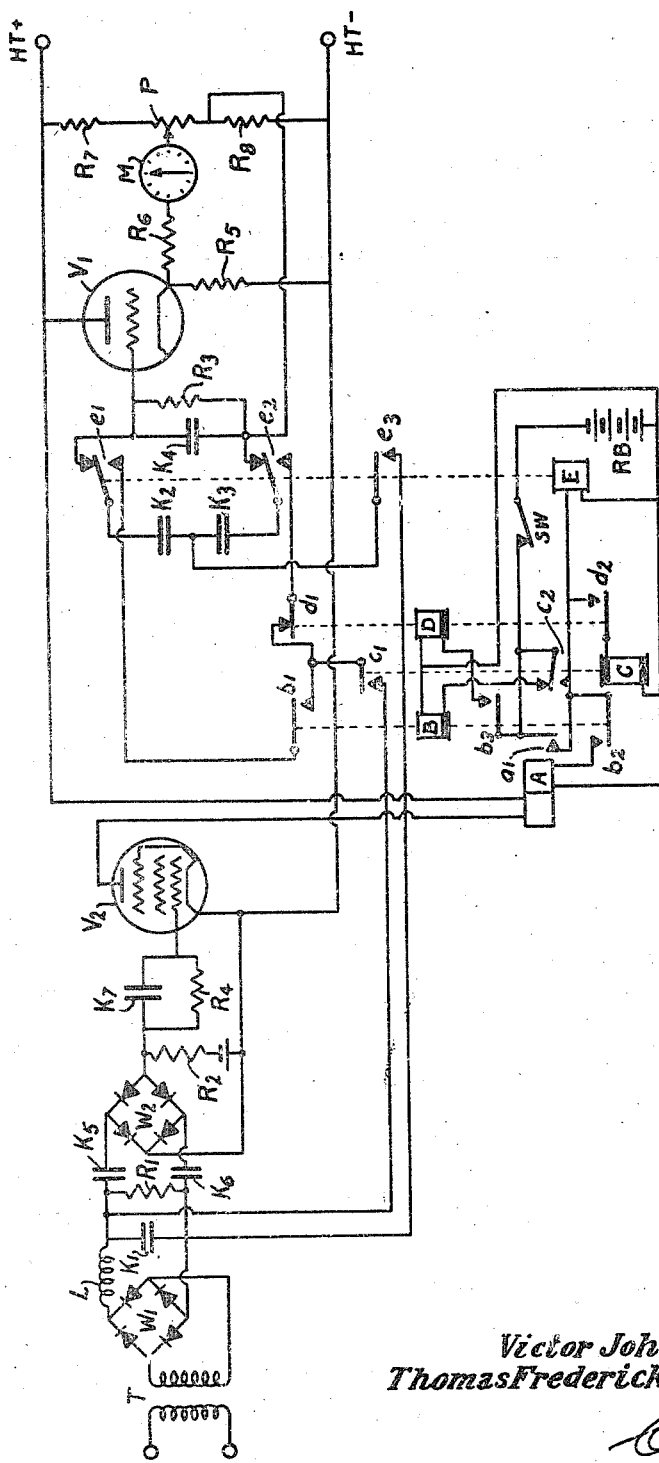
Figure 4:
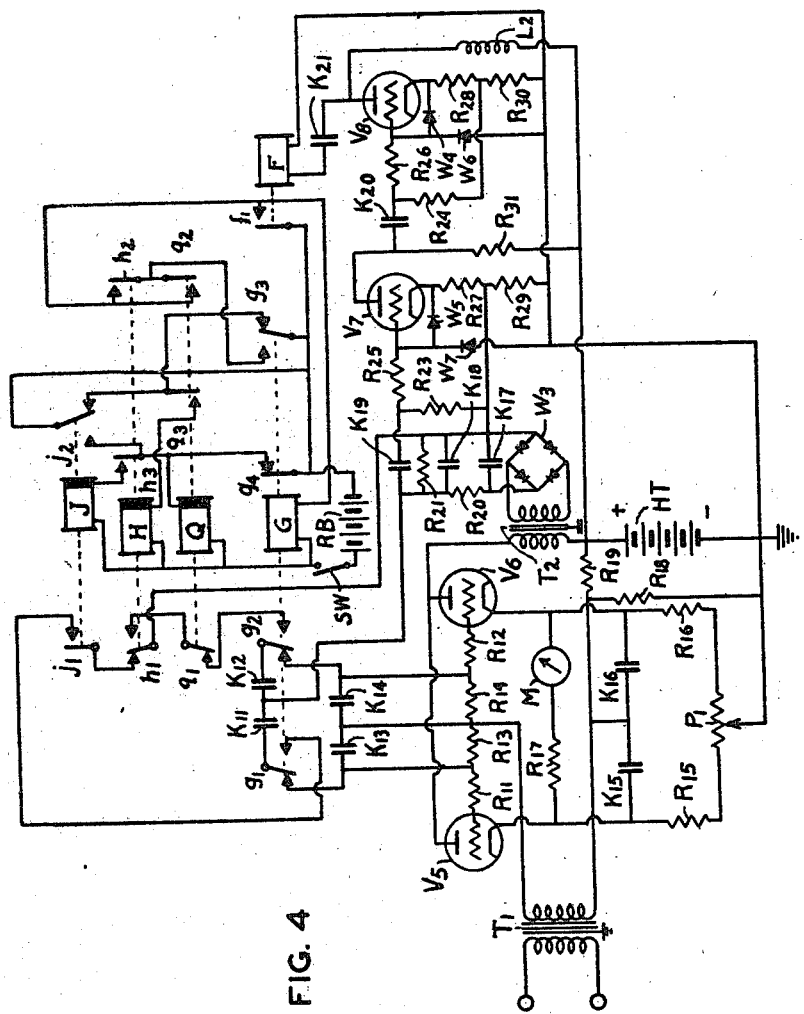

Figs. 1, 2, 5 and 6 show diagrams used for explaining the invention, and Figs. 3 and 4 show schematic circuit diagrams of two embodiments.

In order to explain the invention clearly its application to a particular blind landing system will be described; but it is to be understood that it is not restricted to this application. Referring to Figure 1, sketches (1) and (2) show the form of the voltage of the signals which will be received by the aircraft on one side of the course, and on the other side respectively. They consist of trains of audio frequency waves, for example, at 1000 cycles, the amplitude of which varies according to the dot-dash signals as shown by the outlines. Actually the outlines of the dots will not be absolutely square as shown, but will be somewhat modified in the neighbourhood of the leading and trailing edges on account of the filters or tuned circuits in the transmitting and receiving apparatus. According to the invention, the voltage change $v$ which takes place on the occurrence of the dot is determined both in sign and magnitude by measuring the voltage during two short periods $t_1$ to $t_2$ and $t_3$ to $t_4$ chosen during and after the dot at times when the wave form is not appreciably affected by the filters. If one embodiment of the invention, the voltage $v$ is used to charge a condenser connected to the control grid of a valve having a direct current milliammeter in the plate circuit. Thus if the voltage $v$ remains substantially the same for a succession of dots, the potential applied to the grid will be steady (except for a slight leak which will be referred to later on), and the meter reading will therefore also be steady, since the dots do not have any separate effect on the meter.

If the voltage $v$ should change, the grid voltage will change accordingly and the motor will take up the new reading directly. Although an interfering signal may produce a false reading, this will be corrected by the next dot which is received, so the effect is only momentary.

In another embodiment which is preferred, the voltage $v$ is measured by a bridge arrangement of two valves, the control grid potentials of which are derived respectively from two condensers charged in series from the voltage $v$ so that these potentials change in opposite directions.

Figure 3 shows a schematic circuit diagram of one form of a receiving arrangement for blind landing according to the invention. The signals, such as those shown in (1) or (2) of Figure 1, are applied through the transformer T to a rectifier bridge $W_1$ for deriving the outline corresponding to the dots and dashes. A low pass filter L, $K_1$ is provided for smoothing the output of $W_1$ so that the wave form of the voltage obtained across the resistance $R_1$ will be substantially as shown in Figure 1, (3) or (4). With the help of a train of five relays A, B, C, D and E (whose operation will be explained in detail below) the voltage $v_1$ corresponding to the dot amplitude is applied to charge the condenser $K_2$ during the interval $t_1$ to $t_2$, and the voltage $v_2$ corresponding to the dash amplitude is applied to charge the condenser $K_3$ during the interval $t_3$ to $t_4$. These two condensers are connected in series as shown, and after both are charged they are connected to condenser $K_4$, which will on the first operation assume a potential proportional to $v_1-v_2$, that is, proportional to $v$. The proportion depends on the capacities of the three condensers, and in order to avoid reducing $v$ too much, $K_2$ and $K_3$ should be large compared with $K_4$. The potential of $K_4$ will increase at each subsequent operation until it becomes substantially equal to $v$, and the time taken for this to occur decreases as the capacity of $K_4$ is decreased.

The valve $V_1$ is connected as a cathode follower, with the resistance $R_5$ connected in series with the cathode in the well known way. A potentiometer comprising the resistances $R_7$, P, and $R_8$ is connected across the high tension supply HT. The condenser $K_4$ is connected to a point on this potentiometer as shown, so that the control grid may be operated at a suitable point on the valve characteristic. A centre zero milliammeter M is connected through a resistance $R_6$ to an adjustable point on the resistance P, the adjustment being made so that the milliammeter reads zero when no signals are being received. The milliammeter M is calibrated to indicate the direction and amplitude of the voltage change, thereby indicating the side of the beacon path at which the apparatus is located, and the distance from the signal source. A resistance $R_3$ is connected across the condenser $K_4$ and is provided for the purpose of slowly discharging the condenser $K_4$ so that the meter reading ultimately returns to zero when there are no incoming signals. The time constant of the circuit $K_4$, $R_3$ should however be high enough so that the condenser does not have time to discharge appreciably between the successive dots of the incoming signals.

The condensers $K_2$ and $K_3$ should be equal and as already stated should preferably be large compared with $K_4$, so that connecting the latter does not reduce the voltage $v$ very much. For example, $K_2$ and $K_3$ could be 1 microfarad each, and $K_4$ could be 0.1 microfarad.

The sequence of connections of the condensers $K_2$, $K_3$ and $K_4$ is carried out by the train of five relays A, B, C, D and E. This train is set in operation by the dot signals shown in Fig. 1 (3) or (4) which are obtained across the resistance $R_1$ as already explained. The voltage across $R_1$ is applied to the series circuit comprising the two condensers $K_5$ and $K_6$ and the diagonal points of a second bridge rectifier $W_2$. As far as the condenser circuit is concerned, this rectifier together with $R_2$ may be considered as equivalent to a serially connected resistance, and when a dot similar to Figure 1 (3) arrives, the form of the voltage across this equivalent resistance will be as shown in Figure 1 (5), which is seen to be two oppositely directed pulses whose form depends on the time constant of the series circuit. If the dot had been similar to Figure 1 (4) the two pulses would both be inverted.

The action of the rectifiers is however such that the voltage pulses obtained across the other diagonal points of the bridge will be in the same direction, as shown in Figure 1 (6), irrespective of which kind of dot was received. These voltage pulses are applied to the control grid of a valve $V_2$ through a resistance $R_4$ shunted by a conenser $K_7$, the grid being biassed to cut-off through a resistance $R_2$ as shown. The valve $V_2$ has connected in series with its plate circuit a winding of the first relay A, the operation of which starts a cycle of operation of the relay train.

The resistance $R_4$ and condenser $K_7$ are provided because the magnitude of the pulses applied through $V_2$ to the relay A may vary rather widely. These elements are for the purpose of preventing a large pulse from holding up the relay A too long, so that it interferes with the operation of the relay train. When the pulse is large, grid current flows and charges the condenser $K_7$ so that the grid tends to assume a negative potential. When the pulse potential has passed the maximum value and has fallen below the potential to which $K_7$ is charged, the valve $V_2$ is cut off, thereby allowing A to be released.

The relays are shown according to the detached contact principle. Each relay winding is designated by a capital letter, and its sets of contacts by the corresponding small letter, with a numeral to distinguish the different sets on the same relay. All relays are shown in the unoperated condition, which exists before the relay battery RB has been switched on by throwing in switch SW. Relays B and D are slow to release, and relay C is slow to release and also slow to operate. Assuming that no signals are being received, when switch SW for relay battery RB is switched on, relay B operates; closing of contacts $b_3$ operates D; closing of contacts $b_2$ does not operate relay A but only prepares a locking circuit for A through its right hand winding which is insufficient to pick up the relay armature but sufficient to hold it up, once it has been picked up by the left hand winding of relay A; closing of contacts $b_1$ prepares a charging circuit for condenser $K_2$. The operation of D opens the contacts $d_1$, and closes $d_2$ to prepare a circuit for the operation of C. Thus when the circuit is ready to receive signals, relays B and D are operated, contacts $b_1$, $b_2$, $b_3$ and $d_2$ are closed, and $d_1$ are open.

The subsequent operations of the relay train will be explained by reference to Figure 2.

At the top of Figure 2 is a time scale divided into milliseconds, to which all the diagrams are referred. The curve S represents a dot, similar for example to Figure 1, (3), but with the leading and trailing edges shown as they might be modified by the filters in the circuit. Below the curve S are shown a number of horizontal lines marked $A_2$ to $E_2$ and their lengths represent the times during which the corresponding relays are operated. The initial dotted portion of each denotes the period during which the relay is energised but has not operated. The designation $r$ indicates the point at which the operating current is cut off from the corresponding relay, and the termination of the horizontal line denotes when it releases. The set of lines $A_2$ to $E_2$ are those which apply when the relays have maximum releasing times. Below this set is shown another set $A_1$ to $E_1$ which apply when the relays have minimum releasing times, and this gives an idea of the latitude allowable, and shows that these times are not critical.

When the first of the pulses shown in Figure 1, (6) is applied to the grid of valve $V_2$, it operates relay A, which locks up by its own contacts $a_1$ through the circuit prepared by contacts $b_2$. The closing of the contacts $a_1$ energizes C through the closed contacts $d_2$, and also energises E directly. These operations are supposed to occur at zero time in Figure 2.

Referring to the lines $A_2$ to $E_2$, relay E operates at about 10 milliseconds and changes over its contacts $e_1$ and $e_2$ from their right hand to their left hand position thus disconnecting the condenser $K_4$, and preparing charging circuits for $K_2$ and $K_3$. It also completes the common connection of those condensers to one end of the resistance $R_1$ through its contacts $e_3$. The operation of C is delayed until about 50 milliseconds, when it completes the charging circuit for $K_2$ by connecting it to the other end of $R_1$ through the contacts $c_1$. Referring again to Figure 1, this occurs at the time $t_1$ which is the beginning of the first measuring interval. The operation of C disconnects the winding of B by changing the contacts $c_2$ from top to bottom position. Thereby E and C remain energised in parallel to battery RB even after relay A has subsequently been released. The release of B is delayed by about 60 milliseconds; through contacts $b_2$ the right hand winding locking circuit is operated (so that A releases at about 120 milliseconds). At the same time $b_1$ is opened and the condenser $K_2$ is disconnected, which will have been charged up from the voltage $v_1$ (Figure 1, (3) or (4)). The release of B occurs at the end of the first measuring interval (time $t_2$ in Fig. 1). When the second of the pulses shown in Figure 1, (6) arrives at about 125 milliseconds, it momentarily operates A, but this has no effect, since A cannot now lock up.

The release of B also disconnects D by opening the contacts $b_3$ at about 110 milliseconds. The release of D is delayed until about 300 milliseconds, which is the commencement $t_3$ of the second measuring interval. At this time, contacts $d_1$ close and complete the charging circuit for condenser $K_3$ (which charges up to the voltage $v_2$) and contacts $d_2$ open to disconnect relay C, which releases at about 360 milliseconds. This opens contacts $c_1$, so disconnecting $K_3$ and marking the end $t_4$ of the second measuring interval. Contacts $c_2$ change back, disconnecting E and energising B. Relay E releases at about 380 milliseconds and connects condenser $K_4$ to the condensers $K_2$ and $K_3$ by changing over its contacts $e_1$ and $e_2$. $K_4$ then charges up to a voltage proportional to $v_2-v_1$, that is, proportional to $v$, as already explained. Relay B operates at about 390 milliseconds and the circuit is back in its original condition. The process is repeated each time a dot is received, so that when the amplitude of the dots remains constant, condenser $K_4$ will be maintained at a substantially constant potential (except for the slight leak through $R_3$ between the dots). When the signals cease, the charge on $K_4$ will leak away through $R_3$ so that its potential reaches approximately zero in a reasonable time (a few seconds, for example).

It will be seen that the timing of the relays has been chosen so that the first measuring interval $M_2$ indicated near the curve S occurs as late as possible without at the same time encroaching on that part of the wave form affected by the filters. The corresponding second interval $N_2$ is rather late, and well away from the dot. The interval $M_2$ is determined by the operation time of relay C and by the release time of relay B, and $N_2$ by the release time of relay D and by the release time of relay C. The group of lines $A_1$ to $E_1$ shown in Figure 2 indicate a different timing by which both the measuring intervals $M_1$ and $N_1$ occur as early as possible while avoiding the wave form distortion. The timings of relays B, C and D have all been made shorter. It will be apparent that any intermediate arrangement will operate satisfactorily, so that no precise adjustments of the relay timings are required. It will, of course, be necessary to ensure that the shorter intervals $M_1$ and $N_1$ are sufficient to allow the substantially complete charging of condensers $K_2$ and $K_3$.

Fig. 4 shows another embodiment of the invention, which is the preferred form. This operates according to the same principles as Fig. 3, but includes certain other features by which its performance may be improved. The measuring functions are carried out by a relay train which is differently arranged and is started in a different manner.

The circuit of Fig. 4 comprises four thermionic valves which have been shown as triodes for simplicity, but valves having any number of grids appropriately arranged and polarised may be used if desired. Of these, the valves $V_5$ and $V_6$ serve a double purpose. They are used in parallel to serve as an initial amplifying stage for the signals which are applied through the transformer $T_1$. They are also used as part of the measuring bridge circuit to determine the difference of potential of the measuring condensers, and with the meter M and associated resistances carry out the same function as the valve $V_1$ of Fig. 3.

Valve $V_8$ has substantially the same function as $V_2$ in Fig. 3 and $V_7$ forms an amplifying stage for $V_8$.

The two valves $V_5$ and $V_6$ have their plates connected in parallel through the primary winding of the output transformer $T_2$ to the positive terminal of the high tension source HT. The two control grids are connected through corresponding series resistances $R_{11}$, $R_{13}$ and $R_{12}$, $R_{14}$ in parallel to one terminal of the secondary winding of the input transformer $T_1$, the other terminal of this winding being connected to the cathodes through the bypass condensers $K_{15}$ and $K_{16}$. The resistances $R_{11}$ and $R_{12}$ are equal, as also are $R_{13}$ and $R_{14}$. The cathodes are biassed positively by the cathode current potential drops in the equal resistances $R_{15}$ and $R_{16}$ and the corresponding portions of the potentiometer $P_1$, and the control grids are given a suitably lower positive potential by means of the potentiometer comprising resistances $R_{18}$ and $R_{19}$ connected across the high tension source.

It will be seen that the incoming signals are applied through the transformer $T_1$ to the control grids of the valves $V_5$ and $V_6$ in parallel and amplified signals will thus be obtained from the output transformer $T_2$ connected to the two plates.

The amplified signals are applied to a full wave rectifier $W_3$, which serves the same purpose as $W_1$ in Fig. 3, and the rectified output is smoothed by the circuit comprising the resistance $R_{20}$ and the condensers $K_{17}$ and $K_{18}$, which circuit corresponds in function to the filter L, $K_1$ of Fig. 3, and is a cheaper arrangement. The load resistance $R_{21}$ corresponds to $R_1$ in Fig. 3, and substantially the same type of voltage wave will be obtained across it, as shown in Fig. 1 at (3) or (4).

These voltage waves are used to charge in turn the two equal condensers $K_{11}$ and $K_{12}$ (corresponding to $K_2$ and $K_3$ in Fig. 3) by the action of the relay train which will be presently described, and the potential difference of the two condensers is then used to charge the two equal condensers $K_{13}$ and $K_{14}$ in series, which condensers together correspond to $K_4$ of Fig. 3. When this occurs, the potential of the control grid of one of the valves $V_5$ and $V_6$ will be raised, and that of the other will be lowered by an equal amount. Thus the plate current of the one valve will be increased, and that of the other will be decreased, so that the two cathodes will acquire different potentials, the difference being measured by the milliammeter M connected in series with a suitable resistance $R_{17}$ between the two cathodes. If the initial control grid potentials are so chosen that the valves are operated on the straight part of the characteristic curve, the meter reading will be substantially proportional to the difference of the potentials of the two condensers $K_{11}$ and $K_{12}$. As in the case of Fig. 3, the potentiometer $P_1$ will be adjusted to obtain a zero reading on the milliameter M when no signals are being received.

It is to be noted that the amplifying action of the valves will be substantially unaffected by the measuring function, since the total plate current flowing through the transformer $T_2$ remains constant.

As in the case of Fig. 3, condensers $K_{11}$ and $K_{12}$ should preferably be large compared with $K_{13}$ and $K_{14}$; and the resistances $R_{13}$ and $R_{14}$ should be large enough to prevent appreciable leakage of the charges of $K_{13}$ and $K_{14}$ between successive charging operations.

The voltage across resistance $R_{21}$ is also applied to the valve $V_7$ through a condenser $K_{19}$ which corresponds to $K_5$ and $K_6$ of Fig. 3, the shunt resistance $R_{23}$ corresponding to $R_2$. Thus pulses like Fig. 1, (5) will be applied to the control grid of $V_7$; there is however in this case no rectifier corresponding to $W_2$ of Fig. 3 for a reason to be explained later. The pulses are applied through a resistance $R_{25}$ to the control grid of $V_7$ which is biassed from the cathode by resistance $R_{27}$. rectifier $W_5$ is connected between the control grid and cathode and is directed so as substantially short circuit the control grid and cathode if the amplitude of the signal should be such as to tend to make the grid positive. Rectifier $W_7$ is likewise provided to prevent the potential of the control grid from becoming excessively negative as to risk blocking the valve, and the rectifier is suitably biased with respect to the cathode by means of the two resistances $R_{27}$ and $R_{29}$, the extra resistance being used to provide the additional bias necessary to allow an appropriate range of variation for the control grid potential.

The plate of $V_7$ is connected to the high tension source through the resistance $R_{31}$ and to the control grid of the valve $V_8$ through the condenser $K_{20}$ and resistance $R_{26}$. The valve $V_8$ is equipped in exactly the same way as $V_7$, the elements $R_{26}$, $R_{28}$, $R_{30}$, $W_4$ and $W_6$ corresponding respectively to $R_{23}$, $R_{25}$, $R_{17}$, $R_{29}$, $W_5$ and $W_7$. The plate current of $V_8$ is however supplied through an inductance $L_2$ instead of through a resistance and the plate is connected to the starting relay F through a condenser $K_{21}$.

It is to be noted that the limiting rectifiers are necessary for both valves because the range of amplitude of the incoming signals is liable to be large. When the signals are weak considerable amplification is necessary, and none of the rectifiers will operate. For strong signals, although $W_5$ and $W_7$ would operate, the maximum allowable output of $V_7$ would still be able to block $V_8$, so that $W_4$ and $W_6$ are required to prevent this.

The resistances $R_{11}$ and $R_{12}$ are provided to prevent appreciable radio frequency potentials from being applied to the control grids of $V_5$ and $V_6$. These potentials may be derived from pulses of oscillations generated by the operation of the relay contacts. Such oscillations would be rectified by the valves, and would interfere with the working of the circuit. Resistances $R_{25}$ and $R_{26}$ are provided to limit the grid currents of the corresponding valves so that the charging and discharging of the condensers $K_{19}$ and $K_{20}$ will not be appreciably affected.

The relay F should be a non-polarized or neutral relay, preferably relatively quick to operate. The inductance $L_2$ and condenser $K_{21}$ act as a high pass filter, so that the wave shown in Fig. 1 (5) which is applied to $V_7$ will appear substantially as shown in Fig. 5 when applied to the relay F. This consists practically of two relatively narrow pulses both of which will momentarily operate the relay, since the latter is non-polarized. Thus it does not matter whether the first of these pulses is upwards or downwards, and it is therefore not necessary to provide a rectifier having the function of $W_2$ in Fig. 3 designed to turn the pulses all the same way. It will be clear from what has been said that the rectifiers $W_4$ and $W_7$ do not correspond to $W_2$, but they perform a function similar to that of the network $R_4$, $K_7$ of Fig. 3.

The relay F corresponds to the relay A of Fig. 3, and is used for starting the relay train G, H, J, Q, which carry out the same function as the train B, C, D, E, but in a different way. Relays H, J and Q are slow release relays.

When the relay battery RB is first switched on, relay Q operates through the contacts $g_4$, and operates H through contacts $q_3$ and $j_2$, $g_3$ which are both already closed. Relay Q also prepares a locking circuit for relay G by closing contacts $c_2$. Relay H closes contacts $h_2$ in parallel with $q_2$, and operates relay J by closing contacts $h_3$. Relay J changes over the contacts $j_2$, but relay H will still be held operated through contacts $g_3$. Thus when the relay battery is first switched on, relays H, J and Q are all operated, and G is as yet unoperated. Thus in the measuring circuit contacts $j_1$ are closed, $q_1$ are open, $h_1$ are changed over and $g_1$ and $g_2$ are as shown.

When a dot such as Fig. 1, (1) is received, the relay F is momentarily operated and closes the contacts $f_1$ thus operating relay G, which locks itself through the contacts $g_3$. The second operation of F at the end of the dot will thus have no effect. Relay J being operated, relay H is disconnected by the contacts $g_3$ but does not release for 20 to 40 milliseconds, and maintains for this time the current energising relay J, which current passes through the contacts $j_2$. When H releases, J remains operated for 20 to 40 milliseconds and then releases, disconnecting relay Q and re-operating H. Relay Q is designed to hold up for 100 to 200 milliseconds and on its release at the end of that period it opens contacts $q_2$, but relay G does not release since it is held operated by the contacts $h_2$. The opening of contacts $q_3$ releases H after 20 to 40 milliseconds and this in turn releases G by opening the contacts $h_2$. When G releases, Q, H and J are re-operated by the closing of contacts $g_3$ and $g_4$, and the circuit is back in its original condition.

Fig. 6 shows a timing diagram of the same type as Fig. 2 and applicable to the relay train of Fig. 4. The lines $F_1$ to $Q_1$ represent the operations of the relay F to Q when the release time of H and J is the minimum 20 milliseconds and that of Q is the minimum 100 milliseconds, the corresponding measuring periods being $M_1$ and $N_1$. The lines $F_2$ to $Q_2$ are for the maximum release times of 40 and 200 milliseconds, respectively, the corresponding measuring periods being $M_2$ and $N_2$.

Referring to the measuring circuit of Fig. 4 and also to Fig. 6, just before zero time, contacts $j_1$ are closed, $q_1$ are open, $g_1$ and $g_2$ are as shown (relay G not yet being operated) and contacts $h_1$ are changed over. Soon after the relay F operates, G operates and changes over the contacts $g_1$ and $g_2$, thus preparing the condensers $K_{11}$ and $K_{12}$ to be charged. When relay H releases at time $t_1$, the condenser $K_{11}$ will be connected across $R_{21}$ since contact $j_1$ is closed, and will be charged up to the voltage corresponding to the dot period. When relay J releases at $t_2$, contacts $j_1$ open, disconnecting $K_{11}$. Shortly afterwards relay H is again operated and prepares condenser $K_{12}$ for charging, which occurs at $t_3$ when relay Q releases, closing the contacts $q_1$. Condenser $K_{12}$ is disconnected at $t_4$ when H is again released. Condensers $K_{11}$ and $K_{12}$ are now charged up respectively to the voltages corresponding to the dot and dash periods. The release of G, which occurs very shortly afterwards, connects $K_{11}$ and $K_{12}$ to $K_{13}$ and $K_{14}$ by changing back the contacts $g_1$ and $g_2$, and the voltage difference is then indicated on the milliammeter M.

It should be understood that the embodiments described with reference to Figs. 3 and 4 are only two possible forms of the invention applicable to blind landing of aircraft, and the invention can be employed in other fields; for example wherever a repeated voltage change occurs or can be derived, this change can be measured according to the principles explained or can be made to carry out some function by replacing the meter M by a relay or other utilization device. A particular case arises in telegraph systems where signals are conveyed over a channel by the alternation of two circuit conditions, as in single or double current systems, or in carrier current systems from which single or double current signals can be derived. The voltage changes which represent the signals in such systems can be measured by the method of the invention or can be made to operate apparatus if desired. The essential feature of the invention is the production of a substantially constant current in the branch containing the meter M, which current is proportional to the voltage change $v$.

It will be evident to those skilled in the art that the relay trains illustrated in Figs. 3 and 4 represent only two possible ways of arranging the relays to perform the desired sequence of operations. Alternative circuits employing other series of relays, or sequence switches or the like would clearly also be possible.

It is further to be noted that while in many cases the voltage change $v$ is periodically or regularly repeated, this is not essential. The voltage change could be quite irregularly repeated and a substantially steady reading on the meter M would be obtained so long as the leak of the condenser $K_4$ in Fig. 3 (or condensers $K_{13}$ and $K_{14}$ in Fig. 4) were chosen with regard to the longest times between successive repetitions. Thus good measurements could be obtained during the passage of a general telegraph signal in the Morse code or any other code.

Thus in the claims the term "repeated" or "repeatedly" does not necessarily imply periodic or regular repetition at some definite frequency.

What is claimed is:

1. Apparatus for determining impulse voltage changes occurring in recurring cycles of impulses, comprising two capacitances, means for charging the first capacitance in proportion to an impulse voltage in a cycle of impulses before the change, means for charging the second capacitance in proportion to an impulse voltage in said cycle of impulses after the change, means for determining a substantially constant voltage representing the difference between the charges on said capacitances, and relay means for automatically actuating said capacitance-charging and determining means during successive cycles.

2. Apparatus as set forth in claim 1 in which the capacitance-charging means comprises a relay system including relay-operated switch means for connecting the capacitances successively to a source of said voltages before and after the change, and thereafter to the determining means.

3. Apparatus as set forth in claim 1 in which the determining means comprises a resultant capacitance and means for applying to the resultant capacitance a charge proportionate to the resultant of the charges on the first and second capacitances.

4. Apparatus as set forth in claim 1 including means responsive to a voltage change in each cycle for actuating the first capacitance-charging means and for operating thereafter the second capacitance-charging means and the determining means whenever said first means is actuated.

5. Apparatus as set forth in claim 1 comprising means for actuating the first capacitance-charging means responsive to a voltage change in each cycle, and means for actuating the second capacitance-charging means after a predetermined interval succeeding the actuation of the first capacitance-charging means.

6. Apparatus as set forth in claim 1 comprising means for deriving a voltage pulse from the initial voltage change in a cycle, and means responsive to said voltage pulse for actuating the first capacitance-charging means.

7. Apparatus for determining changes in voltage from a source of electrical impulses comprising two capacitances, a relay system including first relay means for charging the first capacitance from the voltage of an impulse before the voltage change, second relay means for charging the second capacitance from the voltage of an impulse after the change, and means for determining the resultant of the charges on said capacitances, including measuring means proportionally responsive to applied voltages and third relay means controlled by said second relay means for connecting the capacitances in series in the same sense to the responsive means after the capacitances have been charged.

8. Apparatus as set forth in claim 7 in which the relay system comprises means including a delayed operation relay for actuating the second relay means after a predetermined interval following the operation of the first relay means, and means including a delayed operation relay for actuating the third relay means after a predetermined interval following the operation of the second relay means.

9. Apparatus as set forth in claim 7 comprising means responsive to a change in voltage from said source for starting the operation of the relay system.

10. Apparatus for detecting impulse voltage changes in recurring cycles of impulses each including a plurality of voltage changes which comprises normally disconnected means for determining the impulse voltage before and after a voltage change in each cycle, and means responsive to a preceding voltage change in the same cycle for connecting and actuating the determining means.

11. Apparatus as set forth in claim 10 in which the actuating means includes means for producing a pulse actuated by said preceding voltage change.

12. Apparatus as set forth in claim 10 in which the actuating means includes means for generating a pulse actuated by said preceding voltage change, said pulse being generated in the same sense regardless of the direction of said preceding voltage change.

13. Apparatus for determining voltage changes in recurring cycles of impulses comprising means for determining the voltage at a predetermined initial point in each cycle, means for determining voltage at a predetermined later point in said cycle, said first voltage-determining means being responsive to a preceding impulse voltage change in each cycle.

14. Apparatus as set forth in claim 13 including means for actuating the first voltage-determining means after a predetermined interval following a preceding voltage change in each cycle and means for actuating the second voltage-determining means after a predetermined interval following the actuation of the first voltage-determining means.

15. Apparatus selectively responsive to signals which consist of a series of either dot elements or of dash elements produced by voltage changes, comprising first circuit means responsive only to the signal voltage occurring a predetermined period after the beginning of an element less than the duration of a dot element, second circuit means responsive only to the signal voltage occurring a predetermined period after the beginning of said element greater than the duration of a dot element and less than the duration of a dash element, and comparative circuit means responsive to the resultant of said signal voltages to measure the difference thereof.

16. Apparatus as set forth in claim 15 in which each means responsive to a signal voltage comprises a capacitance charged by said voltage, and the means responsive to the resultant of said voltages comprises a capacitance charged from said capacitances connected in series.

17. Apparatus for automatically determining position relative to the course indicated by a radio beacon of the type which produces a steady voltage signal along said course, dot signals at one side of the course and dash signals at the other side of the course, comprising first circuit means responsive only to the signal voltage occurring a predetermined period after the beginning of a signal less than the duration of a dot, second circuit means responsive only to the signal voltage occurring a predetermined period after the beginning of said signal greater than the duration of the dot and less than the duration of a dash, and comparative circuit means responsive to the resultant of said signal voltages to measure the difference thereof.

18. Impulse voltage change detecting apparatus comprising means for deriving a resultant of the voltages of impulses before and after the change, said means comprising a pair of thermionic valves connected in parallel to receive and amplify said impulses, means for producing a current proportional to said resultant voltage, said last mentioned means including the cathode circuits of said two thermionic valves and means for impressing said resultant voltage between the control grids of said valves.

19. Apparatus as set forth in claim 18 in which the valve system includes an indicating device responsive to said proportional current, and means for adjusting said current to zero when no input voltage is applied to the system.

20. Apparatus as set forth in claim 18 in which cathode follower includes two valves having cathode follower connections, and in which the proportional current is generated between the cathodes.

21. Impulse voltage change determining apparatus comprising two capacitances, means for charging the first capacitance with an impulse voltage in proportion to an impulse voltage before the change, means for charging the second capacitance in proportion to an impulse voltage after the change, a third capacitance, and means for applying the charges of said first and second capacitances differentially to said third capacitance thereby producing a resultant of said first capacitance and said second capacitance in said third capacitance, the output of which is a substantially constant voltage representing the difference between charges on said first and second capacitances.

22. Impulse voltage change determining apparatus comprising two capacitances, means for charging the first capacitance with an impulse voltage in proportion to an impulse voltage before the change, means for charging the second capacitance in proportion to an impulse voltage after the change, and determining means comprising a thermionic valve having input and output circuits, said input circuit further comprising a third capacitance, a means for applying to said third capacitance a substantially constant voltage proportional to the resultant of the voltages of said first and second capacitances, and indicating means responsive to current flow in the output circuit.

VICTOR JOHN TERRY.
THOMAS FREDERICK STANLEY HARGREAVES.

REFERENCES CITED

The following references are of record in the file of this patent:

UNITED STATES PATENTS

| Number | Name | Date |
|---|---|---|
| 2,176,742 | La Pierre | Oct. 17, 1939 |
| 2,177,569 | Jorgensen et al. | Oct. 24, 1939 |
| 2,313,666 | Peterson | Mar. 9, 1943 |
| 2,277,461 | Shields | Mar. 24, 1942 |
| 2,249,722 | Nicholson | July 15, 1941 |
| 2,157,006 | Oesinghaus | May 2, 1939 |
| 2,087,995 | Nolke | July 27, 1937 |
| 2,271,534 | Bailey | Feb. 3, 1942 |
| 2,275,298 | Hugenholtz | Mar. 3, 1942 |
| 2,208,349 | Ulbright | July 16, 1940 |
| 2,285,482 | Wunsch | June 9, 1942 |
| 2,191,185 | Wolff | Feb. 20, 1940 |
| 2,217,477 | Gulliksen | Oct. 8, 1940 |
| 2,328,985 | Luck | Sept. 7, 1943 |
| 2,225,348 | Mikelson | Dec. 17, 1940 |
| 2,014,102 | Conklin | Sept. 10, 1935 |
| 2,300,198 | Brown | Oct. 27, 1942 |
| 2,305,307 | Wellenstein et al. | Dec. 15, 1942 |
| 2,323,762 | George | July 6, 1943 |
| 2,329,073 | Mitchell et al. | Sept. 7, 1943 |
| 1,844,886 | Herman | Feb. 9, 1932 |

FOREIGN PATENTS

| Number | Country | Date |
|---|---|---|
| 104,332 | Australian | June 22, 1938 |